US008690726B2

(12) United States Patent
Miyazaki et al.

(10) Patent No.: US 8,690,726 B2
(45) Date of Patent: Apr. 8, 2014

(54) VEHICLE DRIVE DEVICE

(75) Inventors: Terufumi Miyazaki, Toyota (JP);
Yukihiko Ideshio, Nisshin (JP);
Toshihiko Kamiya, Toyota (JP); Shingo Eto, Gamagori (JP); Hironori Asaoka, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/813,735

(22) PCT Filed: Aug. 4, 2010

(86) PCT No.: PCT/JP2010/063214
§ 371 (c)(1),
(2), (4) Date: Apr. 3, 2013

(87) PCT Pub. No.: WO2012/017531
PCT Pub. Date: Feb. 9, 2012

(65) Prior Publication Data
US 2013/0196817 A1 Aug. 1, 2013

(51) Int. Cl.
*B60W 10/02* (2006.01)
(52) U.S. Cl.
USPC ................................................. 477/5
(58) Field of Classification Search
USPC ................. 477/5, 15, 3, 6, 8; 475/5, 3
See application file for complete search history.

(56) References Cited

U.S. PATENT DOCUMENTS 5,875,691 A * 3/1999 Hata et al. .................. 74/661
6,328,122 B1 12/2001 Yamada et al.

(Continued)

FOREIGN PATENT DOCUMENTS

JP 11-150805 6/1999
JP 11-151942 6/1999

(Continued)

OTHER PUBLICATIONS

English Language Translation of JP 2004-306646, published Nov. 4, 2004.

*Primary Examiner* — David D Le
*Assistant Examiner* — David J Hlavka
(74) *Attorney, Agent, or Firm* — Finnegan, Henderson, Farabow, Garrett & Dunner, LLP

(57) ABSTRACT

A vehicle drive device comprising: an engine; a hydraulic transmission device constituting a portion of a power transmission path between the engine and drive wheels; and an electric motor, the engine and the hydraulic transmission device disposed to rotate around one axial center, the electric motor disposed with a rotation axial center different from the one axial center, the electric motor coupled to an input-side rotating element of the hydraulic transmission device receiving input of a drive force from the engine, the input-side rotating element being rotatable around the one axial center, the electric motor coupled to the input-side rotating element via an electric motor coupling rotating element coupled relatively non-rotatably to the input-side rotating element, a hydraulic pump rotationally driven by the input-side rotating element of the hydraulic transmission device disposed such that a rotor of the hydraulic pump rotates around the one axial center, and a coupling portion of the electric motor coupling rotating element for the input-side rotating element inserted into a pump-cover through-hole formed on an internal side of the pump-cover through-hole of the hydraulic pump in a radial direction, along with a portion of the input-side rotating element, and coupled relatively non-rotatably to the input-side rotating element in the pump-cover through-hole, in order to couple the input-side rotating element to the rotor.

8 Claims, 5 Drawing Sheets

(56) References Cited

U.S. PATENT DOCUMENTS

| | | | |
|---|---|---|---|
| 7,115,065 B2* | 10/2006 | Tabata et al. | 477/3 |
| 8,029,404 B2* | 10/2011 | Borgerson | 475/280 |
| 8,337,362 B2* | 12/2012 | Inagaki et al. | 477/175 |
| 8,430,789 B2* | 4/2013 | Hase et al. | 477/5 |
| 2002/0091034 A1* | 7/2002 | Nakamori et al. | 477/3 |
| 2005/0187067 A1* | 8/2005 | Dobereiner | 477/5 |
| 2008/0015085 A1* | 1/2008 | Chapelon et al. | 477/6 |
| 2011/0212809 A1* | 9/2011 | Tsutsui et al. | 477/5 |

FOREIGN PATENT DOCUMENTS

| | | |
|---|---|---|
| JP | 2000-55186 | 2/2000 |
| JP | 2000-324608 | 11/2000 |
| JP | 2002-160540 | 6/2002 |
| JP | 2004-306646 | 11/2004 |
| JP | 2005-126021 | 5/2005 |
| JP | 2007-22112 | 2/2007 |
| JP | 2007-245900 | 9/2007 |
| JP | 2009-1127 | 1/2009 |

\* cited by examiner

FIG.4

|  | C1 | C2 | B1 | B2 | B3 | F1 |
|---|---|---|---|---|---|---|
| 1st | ○ |  |  | ◎ |  | △ |
| 2nd | ○ |  | ○ |  |  |  |
| 3rd | ○ |  |  |  | ○ |  |
| 4th | ○ | ○ |  |  |  |  |
| 5th |  | ○ |  |  | ○ |  |
| 6th |  | ○ | ○ |  |  |  |
| R |  |  |  | ○ | ○ |  |
| N |  |  |  |  |  |  |

◎ OPERATED DURING ENGINE BRAKING
△ OPERATED ONLY DURING DRIVING

VEHICLE DRIVE DEVICE

CROSS-REFERENCE TO RELATED APPLICATIONS

This application is a national phase application of International Application No. PCT/JP2010/063214, filed Aug. 4, 2010, the content of which is incorporated herein by reference.

TECHNICAL FIELD

The present invention relates to a structure of a vehicle drive device including an engine and an electric motor.

BACKGROUND ART

A vehicle drive device is well known that includes an engine and an electric motor as drive force sources for running. For example, this corresponds to a vehicle drive device described in Patent Document 1. The vehicle drive device of Patent Document 1 has an engine, a torque converter that is a hydraulic transmission device, and an electric motor arranged in this order in series on one axial center. The engine is coupled to a pump impeller that is an input-side rotating element of the torque converter and the electric motor is coupled to a turbine runner that is an output-side rotating element of the torque converter.

PRIOR ART DOCUMENTS

Patent Documents

Patent Document 1: Japanese Laid-Open Patent Publication No. 2000-55186
Patent Document 2: Japanese Laid-Open Patent Publication No. 2004-306646
Patent Document 3: Japanese Laid-Open Patent Publication No. 2005-126021

SUMMARY OF THE INVENTION

Problems to be Solved by the Invention

An entire axial length of a vehicle drive device having an engine, a torque converter, and an electric motor disposed in series as in the vehicle drive device of Patent Document 1 may cause a problem of an elongated entire axial length of the vehicle drive device because the axial lengths of the engine, the torque converter, and the electric motor are added together. Particularly, in FF (front-engine front-drive) vehicles in which the engine is transversely mounted, the entire axial length is limited by a vehicle width and, therefore, the problem of the elongated entire axial length presents a larger problem as compared to FR (front-engine rear-drive) vehicles. Such a problem is not well-known.

The present invention was conceived in view of the situations and it is therefore an object of the present invention to provide a vehicle drive device including an engine, a hydraulic transmission device, and an electric motor and enabling a shorter entire axial length of the vehicle drive device.

Means for Solving the Problems

To achieve the object, the present invention provides (a) a vehicle drive device comprising: an engine; a hydraulic transmission device constituting a portion of a power transmission path between the engine and drive wheels; and an electric motor, (b) the engine and the hydraulic transmission device disposed to rotate around one axial center, (c) the electric motor disposed with a rotation axial center different from the one axial center, the electric motor coupled to an input-side rotating element of the hydraulic transmission device receiving input of a drive force from the engine, the input-side rotating element being rotatable around the one axial center.

The Effects of the Invention

Consequently, as compared to the case that the engine, the hydraulic transmission device, and the electric motor are disposed to rotate around the one axial center, i.e., the case that the engine, the hydraulic transmission device, and the electric motor are disposed in series, the entire axial length of the vehicle drive device can be reduced. Therefore, even if the series disposition of the engine, the hydraulic transmission device, and the electric motor is difficult due to limitation of vehicle width in, for example, the FF vehicle having the engine transversely mounted, the vehicle drive device with the shorter entire axial length can easily be mounted on the vehicle.

Preferably, (a) the electric motor is coupled to the input-side rotating element via an electric motor coupling rotating element coupled relatively non-rotatably to the input-side rotating element, wherein (b) a hydraulic pump rotationally driven by the input-side rotating element of the hydraulic transmission device is disposed such that a rotor of the hydraulic pump rotates around the one axial center, and wherein (c) a supporting portion of the electric motor coupling rotating element supporting the electric motor coupling rotating element rotatably relative to a non-rotating member is disposed to overlap with a pump cover of the hydraulic pump in the direction orthogonal to the one axial center. Consequently, as compared to the case that the supporting portion does not overlap with the pump cover in the direction orthogonal to the one axial center, the entire axial length of the vehicle drive device can be reduced. The rotor of the hydraulic pump is disposed to rotate around the one axial center and, therefore, for example, as compared to the case that the hydraulic pump is disposed on an axial center completely different from the hydraulic transmission device etc., a duct line can be shortened between an oil pressure supply destination of the hydraulic pump, for example, the hydraulic transmission device or a bearing on the one axial center, and the hydraulic pump. Therefore, the fluid resistance of the duct line can be reduced to prevent deterioration in fuel economy.

Preferably, (a) the electric motor is coupled to the input-side rotating element via an electric motor coupling rotating element coupled relatively non-rotatably to the input-side rotating element, wherein (b) a hydraulic pump rotationally driven by the input-side rotating element of the hydraulic transmission device is disposed such that a rotor of the hydraulic pump rotates around the one axial center, and wherein (c) a coupling portion for the input-side rotating element of the electric motor coupling rotating element is disposed to overlap with a pump cover of the hydraulic pump in the direction orthogonal to the one axial center. Consequently, as compared to the case that the coupling portion does not overlap with the pump cover in the direction orthogonal to the one axial center, the entire axial length of the vehicle drive device can be reduced. The rotor of the hydraulic pump is disposed to rotate around the one axial center and, therefore, for example, as compared to the case that the hydraulic pump is disposed on an axial center completely different from the hydraulic transmission device etc., a duct line can be shortened between the hydraulic transmission device or a bearing on the one axial center, and the hydraulic pump. Therefore, the fluid resistance of the duct line can be reduced to prevent deterioration in fuel economy.

Preferably, (a) the electric motor coupling rotating element includes outer circumferential teeth for transmitting a drive force from the electric motor to the input-side rotating element, wherein (b) the outer circumferential teeth are disposed to overlap with the supporting portion and a coupling portion for the input-side rotating element of the electric motor coupling rotating element in the direction orthogonal to the one axial center. Consequently, the length in the one axial center direction of the electric motor coupling rotating element can be reduced and the entire axial length of the vehicle drive device can consequently be reduced.

Preferably, the input-side rotating element of the hydraulic transmission device is coupled to the engine via an engine intermittent clutch. Consequently, the engine can be stopped during vehicle running and the fuel economy can be improved.

Preferably, the engine, the hydraulic transmission device, and the electric motor are arranged such that the axial direction of drive axles coupled to the drive wheels and rotationally driving the drive wheels and the one axial center are in parallel with each other.

BRIEF DESCRIPTION OF THE DRAWINGS

FIG. 4 is an operation table for explaining the operation state of the engagement elements when a plurality of shift stages (gear stages) is established in the automatic transmission included in the vehicle drive device of FIG. 1.

MODE FOR CARRYING OUT THE INVENTION

An embodiment of the present invention will now be described in detail with reference to the drawings.

Embodiment

Figure 1:
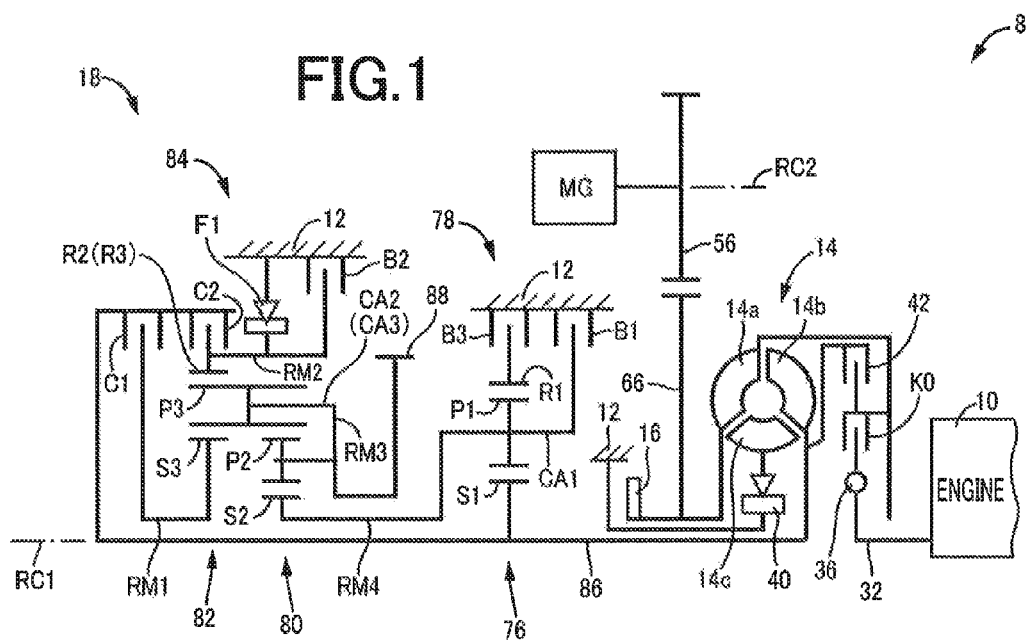
FIG. 1 is a schematic for explaining a configuration of a vehicle drive device to which the present invention is preferably applied.
Figure 2:
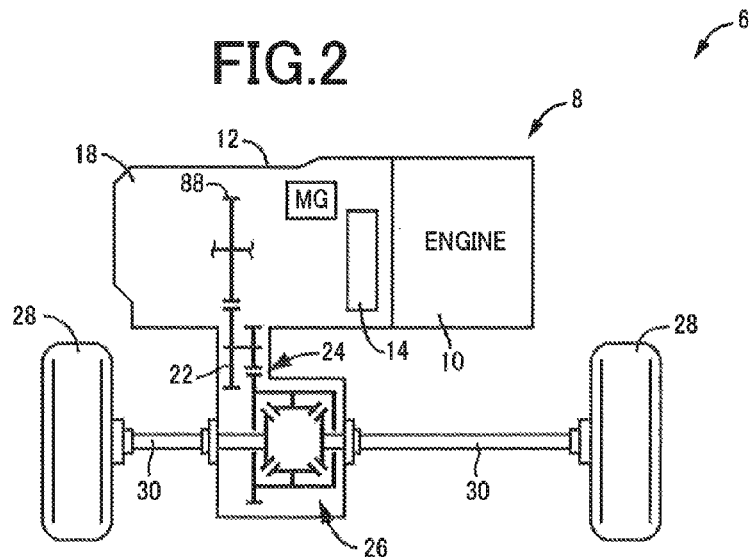
FIG. 2 is a diagram of a power transmission path from the vehicle drive device of FIG. 1 to drive wheels.
Figure 3:
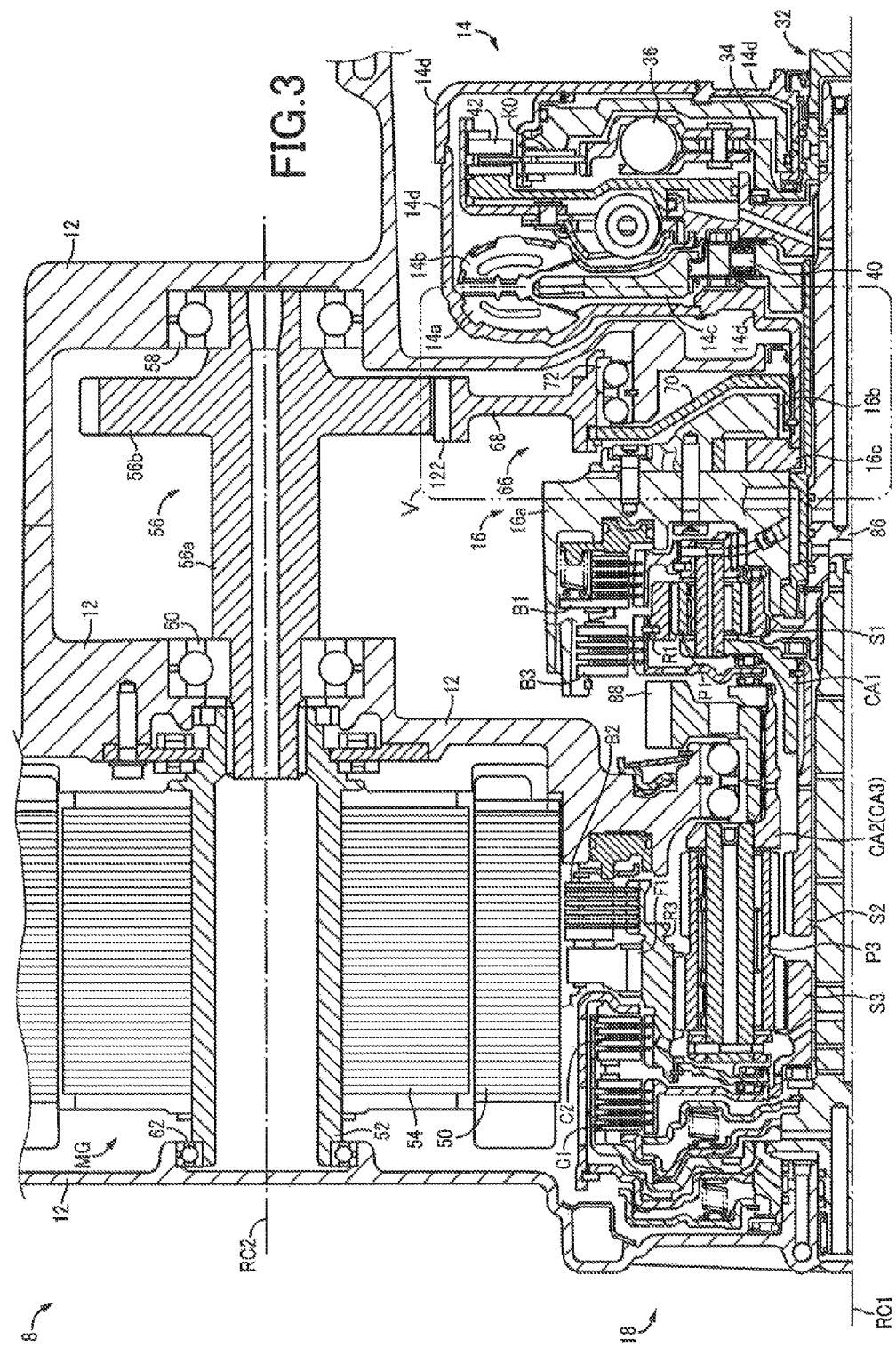
FIG. 3 is a cross-sectional view of a main part of the vehicle drive device of FIG. 1, i.e., an automatic transmission, a torque converter, an electric motor, etc., included in the vehicle drive device.

FIG. 1 is a schematic for explaining a configuration of a vehicle drive device 8 (hereinafter referred to as the "drive device 8") to which the present invention is preferably applied. FIG. 2 is a diagram of a power transmission path from the drive device 8 to drive wheels 28. FIG. 3 is a cross-sectional view of a main part of the drive device 8, i.e., an automatic transmission 18, a torque converter 14, an electric motor MG, etc. The automatic transmission 18, the torque converter 14, etc., are configured substantially symmetrically relative to a center line (a first axial center RC1) and lower halves from the center line are not depicted in FIGS. 1, 3, 5, and 6. In FIGS. 1, 3, 5, and 6, the first axial center RC1 corresponds to one axial center of the present invention and a second axial center RC2 is a rotation axial center of the electric motor MG.

As depicted in FIG. 1, the drive device 8 has a transaxle case (T/A case) 12 (hereinafter referred to as the "case 12") as a non-rotating member attached to a vehicle body by bolts etc., includes an engine intermittent clutch K0, the torque converter 14, a hydraulic pump 16, and the automatic transmission 18 in the case 12 on the first axial center RC1 in order, i.e., in series, from the side of the engine 10, and includes the electric motor MG rotationally driven around the second axial center RC2 parallel to the first axial center RC1. As depicted in FIG. 2, the drive device 8 includes a counter driven gear 22 engaged with an output gear 88 that is an output rotating member of the automatic transmission 18, a final gear pair 24, and a differential gear device (differential gear) 26 coupled via the final gear pair 24 to the counter driven gear 22 in the case 12. The drive device 8 configured as described above is transversely mounted on the front side of a front-wheel drive, i.e., FF (front-engine front-drive) vehicle 6, for example, and is preferably used for driving the drive wheels 28. In the drive device 8, if the engine intermittent clutch K0 is engaged, the power of engine 10 is transmitted from an engine coupling shaft 32 coupling the engine 10 and the engine intermittent clutch K0, sequentially through the engine intermittent clutch K0, the torque converter 14, the automatic transmission 18, the counter driven gear 22, the final gear pair 24, the differential gear device 26, a pair of driving axles 30, etc., to a pair of the drive wheels 28.

The engine 10 is included in the drive device 8 and is an internal combustion engine such as a gasoline engine and a diesel engine having a crankshaft rotationally driven around the first axial center RC1.

In FIG. 3, the engine coupling shaft 32 included in the drive device 8 is disposed rotatably around the first axial center RC1 and unmovably in the first axial center RC1 direction relative to the case 12. The engine coupling shaft 32 is relatively non-rotatably coupled at one end to the crankshaft (engine output shaft) of the engine 10 and includes a clutch coupling portion 34 projecting radially outward at the other end. The clutch coupling portion 34 includes a buffer device 36 having a spring etc., as constituent parts and the buffer device 36 acts as a damper transmitting an engine torque Te to the engine intermittent clutch K0 while suppressing the pulsation of the engine torque Te.

The engine intermittent clutch K0 is a wet multi-plate type hydraulic friction engagement device in which a plurality of friction plates overlapped with each other is pressed by a hydraulic actuator, and is subjected to engagement/release control by a hydraulic control circuit included in the drive device 8 by using an oil pressure generated by the hydraulic pump 16 as an original pressure. The engine intermittent clutch K0 includes a pair of clutch rotating members (a clutch hub and a clutch drum) relatively rotatable around the first axial center RC1 in the released state thereof and one of the clutch rotating members (the clutch hub) is relatively non-rotatably coupled to a radially outer circumferential end of the clutch coupling portion 34 while the other of the clutch rotating members (the clutch drum) is relatively non-rotatably coupled to a pump impeller 14a via a torque converter case 14d of the torque converter 14. Because of such a configuration, the engine intermittent clutch K0 rotates the pump impeller 14a integrally with the engine 10 via the engine coupling shaft 32 in the engaged state. Therefore, in the engaged state of the engine intermittent clutch K0, the drive force from the engine 10 is input to the pump impeller 14a. On the other hand, in the released state of the engine intermittent clutch K0, the power transmission between the pump impeller 14a and the engine 10 is interrupted.

The torque converter 14 is a hydraulic transmission device making up a portion of the power transmission path between the engine 10 and the drive wheels 28 and disposed to rotate around the first axial center RC1 and includes the pump impeller 14a, a turbine impeller 14b, a stator impeller 14c, and the torque converter case 14d. The torque converter 14 transmits a drive force input to the pump impeller 14a via fluid to the automatic transmission 18. The pump impeller 14a of the torque converter 14 is fixed to the inside of the torque converter case 14d and is coupled via the torque converter case 14d to the engine intermittent clutch K0. Therefore, the pump impeller 14a and the torque converter case 14d are coupled successively through the engine intermittent clutch K0 and the engine coupling shaft 32 to the engine 10, and the pump impeller 14a and the torque converter case 14d correspond to an input-side rotating element of the present invention receiving the input of the drive force from the engine 10 and rotatable around the first axial center RC1. The turbine impeller 14b is an output-side rotating element of the torque converter 14 and is relatively non-rotatably coupled to a transmission input shaft 86 that is an input shaft of the automatic transmission 18 by the spline fitting, etc. The stator impeller 14c is coupled via a unidirectional clutch 40 to a pump body 16a of the hydraulic pump 16 bolted to the case 12. Therefore, the stator impeller 14c is coupled via the unidirectional clutch 40 to a non-rotating Member. The torque converter case 14d houses the pump impeller 14a, the turbine impeller 14b, the stator impeller 14c, and the engine intermittent clutch K0 and is disposed rotatably around the first axial center RC1 and unmovably in the first axial center RC1 direction relative to the case 12. The torque converter case 14d integrally rotates around the first axial center RC1 with the pump impeller 14a fixed to the inside thereof.

The torque converter 14 houses and includes a lockup clutch 42 in the torque converter case 14d. The lockup clutch 42 is a direct clutch disposed between the pump impeller 14a and the turbine impeller 14b and is put into an engaged state, a slip state, or a released state by hydraulic control etc. When the lockup clutch 42 is put into the engaged state, strictly, into the completely engaged state, the pump impeller 14a and the turbine impeller 14b are integrally rotated around the first axial center RC1

The electric motor MG has the second axial center RC2 different from the first axial center RC1 as the rotation axial center and is a so-called motor generator having a motor function of outputting a drive force along with an electric generation function of charging an electric storage device. The electric motor MG includes an electric motor stator 50 fixed to the inside of the case 12 by bolts etc., an electric motor output shaft 52 disposed on the inner circumferential side of the electric motor stator 50 to be rotatable around the second axial center RC2 relative to the electric motor stator 50, and an electric motor rotor 54 disposed on the inner circumferential side of the electric motor stator 50 to be fixed to the outer circumference of the electric motor output shaft 52.

The drive device 8 has an electric motor output gear 56 disposed in series with the electric motor MG and including a shaft portion 56a with a direction of the second axial center RC2 defined as the longitudinal direction and a gear portion 56b projecting radially outward from the shaft portion 56a into a disc shape and having outer circumferential teeth of a gear on the outer circumference. The shaft portion 56a is supported at the both ends rotatably around the second axial center RC2 and unmovably in the second axial center RC2 direction via ball bearings 58 and 60 relative to the case 12. One end of the electric motor output shaft 52 is relatively non-rotatably coupled to one end of the shaft portion 56a by the spline fitting, and the other end of the electric motor output shaft 52 is supported rotatably around the second axial center RC2 via a ball bearing 62 relative to the case 12. Because of such a configuration, the electric motor output shaft 52, the electric motor rotor 54, and the electric motor output gear 56 are unmovable in the second axial center RC2 direction relative to the case 12 and integrally rotate around the second axial center RC2.

On the first axial center RC1, the drive device 8 includes an electric motor coupling rotating element 66 coupling the electric motor output gear 56 and the torque converter case 14d in a power transmittable manner. The electric motor coupling rotating element 66 has an electric motor coupling gear 68 having outer circumferential teeth 122 on the outer circumference mutually engaging with the electric motor output gear 56 so as to transmit a drive force from the electric motor MG to the pump impeller 14a and a flange-shaped coupling member 70 interposed between the electric motor coupling gear 68 and the torque converter case 14d. The electric motor coupling gear 68 is supported rotatably around the first axial center RC1 and unmovably in the first axial center RC1 direction via a ball bearing 72 relative to the case 12. The ball bearing 72 is a double-row angular contact bearing having an inner ring and an outer ring relatively unmovable in the first axial center RC1 direction. The coupling member 70 is relatively non-rotatably coupled at an inner circumferential end to the torque converter case 14d by the spline fitting, etc., and is relatively non-rotatably coupled at an outer circumferential end to the electric motor coupling gear 68 by the spline fitting, etc. Therefore, the electric motor coupling rotating element 66 is coupled relatively non-rotatably around the first axial center RC1 to the torque converter case 14d and the pump impeller 14a fixed thereto. The electric motor MG is operatively coupled via the electric motor output gear 56 and the electric motor coupling rotating element 66 to the pump impeller 14a as described above and the drive force from the electric motor MG is transmitted successively through the electric motor output gear 56, the electric motor coupling rotating element 66, and the torque converter case 14d to the pump impeller 14a. As can be seen from FIG. 3, the pitch circle diameter of the electric motor output gear 56 is smaller than the pitch circle diameter of the electric motor coupling gear 68. Therefore, since the number of teeth of the electric motor output gear 56 is smaller than the number of teeth of the electric motor coupling gear 68, the rotation of the electric motor MG is reduced and transmitted to the pump impeller 14a. In other words, an output torque Tmg of the electric motor MG (hereinafter referred to as "electric motor torque Tmg") is amplified and transmitted from the electric motor MG to the pump impeller 14a. The detailed shapes etc., of the electric motor coupling gear 68 and the coupling member 70 will be described later with reference to FIG. 5.

The automatic transmission 18 is a transmission making up a portion of the power transmission path between the torque converter 14 and the drive wheels 28 (see FIG. 2) and the drive forces from the engine 10 and the electric motor MG are input thereto. The automatic transmission 18 is a transmission including a plurality of hydraulic friction engagement devices (clutches C, brakes B), specifically, five hydraulic friction engagement devices, and selectively establishing a plurality of shift stages (gear stages) by switching any of a plurality of the hydraulic friction engagement devices to be gripped. In short, the automatic transmission 18 is a stepped transmission performing so-called clutch-to-clutch shift frequently used in generic vehicles. As depicted in FIG. 1, the automatic transmission 18 has a first transmission portion 78 made up mainly of a first planetary gear device 76 of the single pinion type and a second transmission portion 84 made up mainly of a second planetary gear device 80 of the double pinion type and a third planetary gear device 82 of the single pinion type as the Ravigneaux type on the same axis line (on the first axial center RC1) and changes the speed of the rotation of the transmission input shaft 86 to output the rotation from the output gear 88. The transmission input shaft 86 corresponds to an input member of the automatic transmission 18 and is a turbine shaft rotationally driven by the turbine impeller 14b of the torque converter 14 in this embodiment. The output gear 88 corresponds to an output member of the automatic transmission 18 and mutually engages with the counter driven gear 22 (see FIG. 2) to make up one gear pair together with the counter driven gear 22. As depicted in FIG. 2, the rotation of the output gear 88 is transmitted successively through the counter driven gear 22, the final gear pair 24, the differential gear device 26, and a pair of the driving axles 30 to a pair of the drive wheels (front wheels) 28 and, therefore, when an output rotation speed Nout (rpm) of the automatic transmission 18, i.e., the rotation speed of the output gear 88 is higher, a vehicle speed V (km/h) is higher, and the output rotation speed Nout corresponds one-to-one to the vehicle speed V.

The first planetary gear device 76 making up the first transmission portion 78 includes a first sun gear S1, a first pinion gear P1, a first carrier CA1 supporting the first pinion gear P1 in a rotatable and revolvable manner, and a first ring gear R1 engaging via the first pinion gear P1 with the first sun gear S1, and the first sun gear S1, the first carrier CA1, and the first ring gear R1 respectively make up three rotating elements. In the first planetary gear device 76, when the first sun gear S1 is coupled to the transmission input shaft 86 and rotationally driven and the first ring gear R1 is non-rotatably fixed via a third brake B3 to the case 12, the first carrier CA1 acting as an intermediate output member is rotated at a reduced speed relative to the transmission input shaft 86.

The second planetary gear device 80 making up the second transmission portion 84 includes a second sun gear S2, a second pinion gear P2 and a third pinion gear P3 engaged with each other to make up a pair, a second carrier CA2 supporting the pinion gears P2 and P3 in a rotatable and revolvable manner, and a second ring gear R2 engaging via the pinion gears P2 and P3 with the second sun gear S2. The third planetary gear device 82 making up the second transmission portion 84 includes a third sun gear S3, a third pinion gear P3, a third carrier CA3 supporting the third pinion gear P3 in a rotatable and revolvable manner, and a third ring gear R3 engaging via the third pinion gear P3 with the third sun gear S3. In the second planetary gear device 80 and the third planetary gear device 82, portions are coupled to each other to make up four rotating elements RM1 to RM4. Specifically, the third sun gear S3 of the third planetary gear device 82 makes up the first rotating element RM1; the second ring gear R2 of the second planetary gear device 80 and the third ring gear R3 of the third planetary gear device 82 are coupled to each other to make up the second rotating element RM2; the second carrier CA2 of the second planetary gear device 80 and the third carrier CA3 of the third planetary gear device 82 are coupled to each other to make up the third rotating element RM3; and the second sun gear S2 of the second planetary gear device 80 makes up the fourth rotating element RM4. The second planetary gear device 80 and the third planetary gear device 82 are formed as a Ravigneaux type planetary gear train with the second and third carriers CA2 and CA3 made up of a common member, the second and third ring gears R2 and R3 made up of a common member, and the third pinion gear P3 of the third planetary gear device 82 also acting as one of the pinion gears of the second planetary gear device 80.

The first rotating element RM1 (the third sun gear S3) is selectively coupled via a first clutch C1 to the transmission input shaft 86. The second rotating element RM2 (the ring gears R2, R3) is selectively coupled via a second clutch C2 to the transmission input shaft 86 and is selectively coupled by a second brake B2 to the case 12 to stop rotation. The fourth rotating element RM4 (the second sun gear S2) is integrally coupled to the first carrier CA1 of the first planetary gear device 76 and is selectively coupled by a first brake B1 to the case 12 to stop rotation. The third rotating element RM3 (the carriers CA2, CA3) is integrally coupled to the output gear 88 to output rotation. A unidirectional clutch F1 is an engagement element allowing positive rotation of the second rotating element RM2 (the same rotation direction as the transmission input shaft 86) and preventing inverse rotation and is disposed between the second rotating element RM2 and the case 12 in parallel with the second brake B2.

The clutches C1, C2 and the brakes B1, B2, B3 (hereinafter simply referred to as "clutches C", "brakes B" if not particularly distinguished) are hydraulic friction engagement devices (hydraulic friction engagement elements) subjected to engagement control by hydraulic actuators, such as wet multi-plate type clutches and brakes, and are subjected to engagement/release control by the hydraulic control circuit included in the drive device 8 by using an oil pressure generated by the hydraulic pump 16 as an original pressure. The engagement/release control of each of the clutches C and the brakes B establishes each gear stage (each shift stage) of six forward speeds and one reverse speed as depicted in FIG. 4 depending on accelerator operation of a driver, a vehicle speed V, etc. In FIG. 4, "1st" to "6th" mean the first to six speed forward gear stages; "R" means the reverse gear stage; and gear ratios γ (=input rotation speed Nin/output rotation speed Nout) of the automatic transmission 18 corresponding to the gear stages are appropriately determined by gear ratios (=the number of sun gear teeth/the number of ring gear teeth) ρ1, ρ2, and ρ3 of the first planetary gear device 76, the second planetary gear device 80, and the third planetary gear device 82. An operation table of FIG. 4 summarizes the relationship between the gear stages and the operation states of the clutches C1, C2, and the brakes B1 to B3 with "circles" indicative of engagement, a "double circle" indicative of engagement only during engine brake, and blanks indicative of release. The input rotation speed Nin is a rotation speed of the transmission input shaft 86 and the output rotation speed Nout is a rotation speed of the output gear 88.

FIG. 4 is an operation table for explaining the operation state of the engagement elements when a plurality of shift stages (gear stages) established in the automatic transmission 18. The automatic transmission 18 has six forward shift stages (forward gear stages) from the first speed gear stage "1st" to the sixth speed gear stage "6th" and a reverse shift stage of the reverse shift stage "R" established depending on a combination of the coupling states of any of the rotating elements (the sun gears S1 to S3, the carriers CA1 to CA3, the ring gears R1 to R3) of the first transmission portion 78 and the second transmission portion 84. As depicted in FIG. 4, for example, with regard to the forward gear stages, (1) the first speed gear stage is established by the engagement of the clutch C1 and the brake B2; (2) the second speed gear stage having a gear ratio γ smaller than the first speed gear stage is established by the engagement of the first clutch C1 and the first brake B1; (3) the third speed gear stage having a gear ratio γ smaller than the second speed gear stage is established by the engagement of the first clutch C1 and the third brake B3; (4) the fourth speed gear stage having a gear ratio γ smaller than the third speed gear stage is established by the engagement of the first clutch C1 and the second clutch C2; (5) the fifth speed gear stage having a gear ratio γ smaller than the fourth speed gear stage is established by the engagement of the second clutch C2 and the third brake B3; and (6) the sixth speed gear stage having a gear ratio γ smaller than the fifth speed gear stage is established by the engagement of the second clutch C2 and the first brake B1. The automatic transmission 18 is basically configured such that the reverse gear stage is established by the engagement of the second brake B2 and the third brake B3 and that a neutral state "N" is achieved by releasing all of the clutches C1, C2, and the brakes B1 to B3. In the automatic transmission 18 of this embodiment, two hydraulic friction engagement devices are engaged to achieve a predetermined gear stage and when one of the two hydraulic friction engagement devices is released, the predetermined gear stage is not established and the power transmission path in the automatic transmission 18 is released to be in the neutral state.

Since the unidirectional clutch F1 is disposed in parallel with the brake B2 establishing the first speed gear stage "1st", the brake B2 may not necessarily be engaged at startup (at the time of acceleration). As depicted in FIG. 4, one or the other of the first clutch C1 and the second clutch C2 is always engaged in any of the forward gear stages. In other words, the engagement of the first clutch C1 or the second clutch C2 is a requirement of achievement of the forward gear stages and, therefore, in this embodiment, the first clutch C1 or the second clutch C2 corresponds to a forward clutch (forward clutch).

Figure 5:
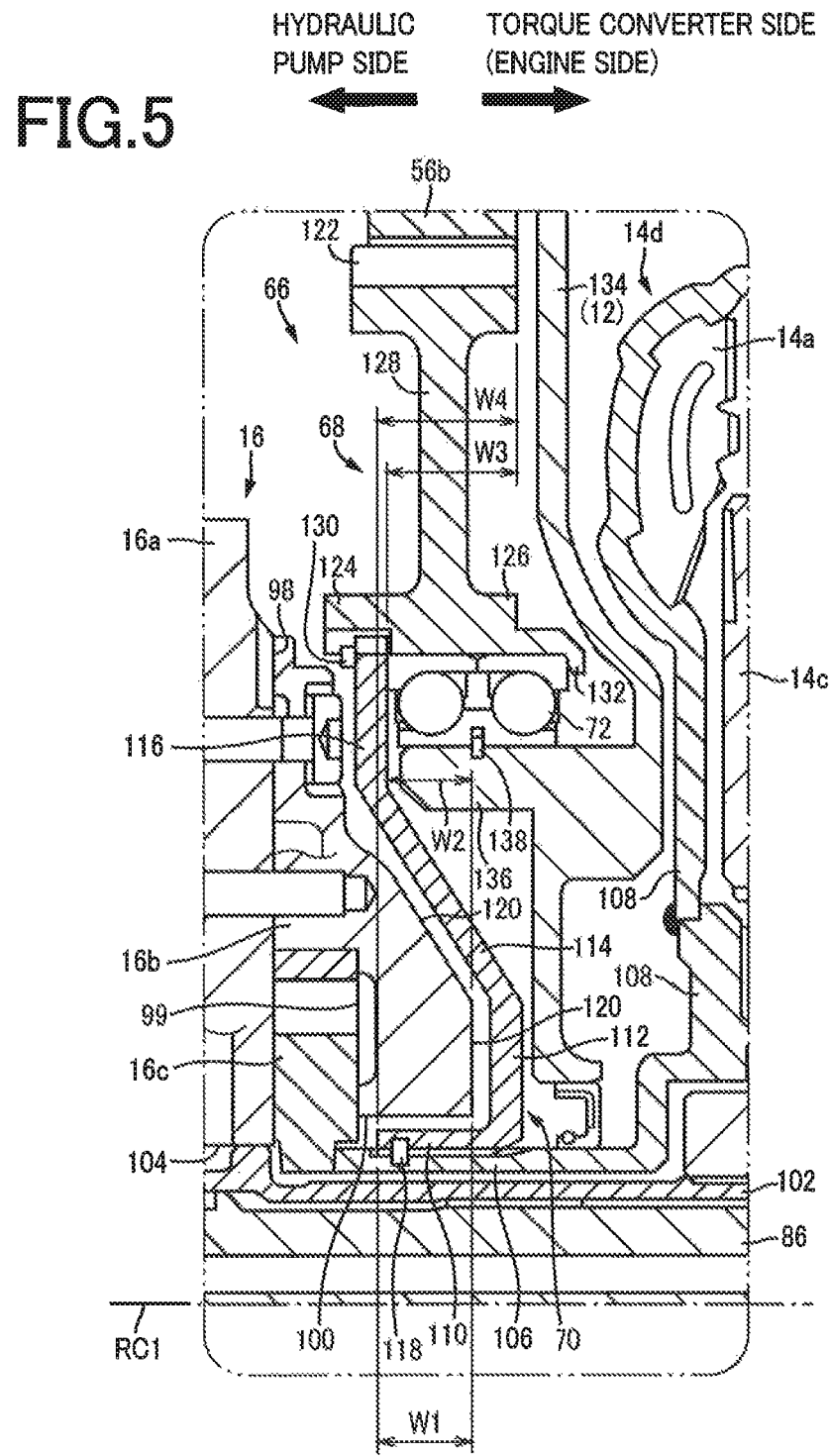
FIG. 5 is a cross-sectional view for explaining the electric motor coupling rotating element included in the vehicle drive device of FIG. 1 and the vicinity thereof and is a cross-sectional view of a portion V extracted from FIG. 3.

FIG. 5 is a cross-sectional view for explaining the electric motor coupling rotating element 66 and the vicinity thereof and is a cross-sectional view of a portion V extracted from FIG. 3. In FIGS. 5 and 3, the hydraulic pump 16 is a mechanical oil pump rotationally driven by the torque converter case 14d, generates an original pressure for the hydraulic control of the clutches and the brakes, and supplies lubricant oil (operating oil) to lubrication locations such as the ball bearings 58, 60, 62, and 72 in the drive device 8. The hydraulic pump 16 includes a pump body 16a as a non-rotating member that is a pump main body bolted to the case 12, a pump cover 16b as a non-rotating member bolted to the pump body 16a, and a pump rotor 16c disposed to rotate around the first axial center RC1. The hydraulic pump 16 generates an oil pressure when the pump rotor 16c is rotated.

The pump cover 16b is a member housing the pump rotor 16c inside and acting as a cover over the pump rotor 16c. The pump cover 16b is attached to the pump body 16a to project in the first axial center RC1 direction toward the torque converter 14 (the engine 10) from a cover attachment surface 98 that is a side surface of the pump body 16a on the side of the torque converter 14, and a space for housing the pump rotor 16c is formed by the inside of the pump cover 16b, i.e., a wall surface 99 on the side of the pump body 16a and the cover attachment surface 98. The pump cover 16b includes, for example, a circular cross-section pump-cover through-hole 100 having the central axis identical to the first axial center RC1 on the radially inner side. A projection amount of the projection of the pump cover 16b from the cover attachment surface 98 in the first axial center RC1 direction is largest on the radially inner side and is made smaller toward the radially outer side.

The pump rotor 16c projects from the pump body 16a in the first axial center RC1 direction within the space formed by the wall surface 99 of the pump cover 16b on the side of the pump body 16a and the cover attachment surface 98. Therefore, although the pump rotor 16c is disposed to project in the first axial center RC1 direction from the cover attachment surface 98 toward the torque converter 14, a projection amount of the pump rotor 16c from the cover attachment surface 98 is smaller than the projection amount of the pump cover 16b.

As depicted in FIG. 5, a cylindrical non-rotating coupling member 102 with the transmission input shaft 86 inserted therethrough is disposed on the first axial center RC1 between the torque converter 14 and the hydraulic pump 16. The non-rotating coupling member 102 is rotatable around the first axial center RC1 relative to the transmission input shaft 86. The non-rotating coupling member 102 is coupled at one end via the unidirectional clutch 40 to the stator impeller 14c of the torque converter 14 and is non-rotatable around the first axial center RC1 relative to an element of the unidirectional clutch 40 on the side of the non-rotating coupling member 102. On the other hand, the other end of the non-rotating coupling member 102 is fit into an inner diameter hole 104 of the pump body 16a formed around the first axial center RC1 and is fixed non-rotatably around the first axial center RC1 and unmovably in the first axial center RC1 direction to the pump body 16a fixed to the case 12. Since the non-rotating coupling member 102 is interposed between the pump body 16a and the unidirectional clutch 40, the stator impeller 14c is coupled via the unidirectional clutch 40 to the non-rotating member as described above. The pump rotor 16c is disposed with a through-hole having the non-rotating coupling member 102 inserted therethrough so as not to interfere with the non-rotating coupling member 102.

The torque converter case 14d is coupled to the pump rotor 16c and coupled to the coupling member 70 as described above and, in particular, includes a torque converter side coupling portion 106 to be coupled thereto. The torque converter side coupling portion 106 has a cylindrical shape with the central axis identical to the first axial center RC1 and is disposed to project from an inner circumferential end of a side wall 108 of the torque converter case 14d on the side of the hydraulic pump 16 to the pump rotor 16c in the first axial center RC1 direction. The non-rotating coupling member 102 is inserted on the inner circumferential side of the torque converter side coupling portion 106 and the torque converter side coupling portion 106 is rotatable around the first axial center RC1 relative to the non-rotating coupling member 102. The torque converter side coupling portion 106 is coupled on the side opposite to a base end portion leading to the side wall 108, i.e., at a leading end portion, so as to rotate around the first axial center RC1 along with the pump rotor 16c. Therefore, the torque converter side coupling portion 106 is inserted into the pump-cover through-hole 100 so as not to interfere with the pump cover 16b and is coupled to the pump rotor 16c. As a result, the rotation of the torque converter case 14d is transmitted to the pump rotor 16c.

The coupling member 70 described above is a member interposed between, and coupling, the electric motor coupling gear 68 and the torque converter case 14d relatively non-rotatably around the first axial center RC1 and, in particular, includes an electric motor coupling rotating element side coupling portion 110, a first flange portion 112, a second flange portion 114, and a third flange portion 116 connected successively from the radially inner side to the outer side. The coupling member 70 is, for example, a steel plate formed by press working and has a substantially constant thickness. The coupling member 70 is disposed closely to the hydraulic pump 16, specifically, the pump cover 16b, so as to reduce the axial length of the drive device 8, and the entire coupling member 70 is disposed with a distance equal to or greater than a predetermined degree from the pump cover 16b such that the rotation is not prevented by the pump cover 16b, which is a non-rotating member. The electric motor coupling rotating element side coupling portion 110 acts as a coupling portion for the torque converter case 14d making up a portion of the input-side rotating element and, therefore, corresponds to a coupling portion of the present invention. The electric motor coupling rotating element side coupling portion 110 is a cylindrical portion disposed on the same axis as the torque converter side coupling portion 106 (on the first axial center RC1) and on the outer circumferential side of the torque converter side coupling portion 106 and is coupled relatively non-rotatably around the first axial center RC1 by the spline fitting and relatively unmovably in the first axial center RC1 direction by a snap ring 118 to the torque converter side coupling portion 106. The leading end of the electric motor coupling rotating element side coupling portion 110 is located at a position at a predetermined distance from the pump rotor 16c in the first axial center RC1 direction inside the pump-cover through-hole 100 and the base end of the electric motor coupling rotating element side coupling portion 110 is located at a position closer to the torque converter 14 (the engine 10) out of the pump-cover through-hole 100. Therefore, the electric motor coupling rotating element side coupling portion 110 is inserted on the leading end side into the pump-cover through-hole 100 along with the torque converter side coupling portion 106 and the snap ring 118 while projecting on the base end side from the pump-cover through-hole 100 toward the torque converter 14. In other words, the electric motor coupling rotating element side coupling portion 110 has a portion disposed to overlap with the pump cover 16b in the direction orthogonal to the first axial center RC1. Specifically, in an axial range W1 of FIG. 5, the electric motor coupling rotating element side coupling portion 110 is disposed to overlap with the pump cover 16b in the direction orthogonal to the first axial center RC1.

The first flange portion 112 of the coupling member 70 has a disc shape projected radially outward from the base end of the electric motor coupling rotating element side coupling portion 110 with a gap from a side surface 120 of the pump cover 16b on the side of the torque converter 14 (the engine 10). The second flange portion 114 has a taper shape protruding toward the hydraulic pump 16 in the first axial center RC1 direction as the second flange portion 114 extends radially outward from the outer circumferential end of the first flange portion 112, and has the shape substantially parallel to the taper angle of the side surface 120 on the side of the torque converter 14 with a gap from the side surface 120 of the pump cover 16b on the side of the torque converter 14. The third flange portion 116 has a disc shape projected radially outward from the outer circumferential end of the second flange portion 114 with a gap from the side surface 120 of the pump cover 16b on the side of the torque converter 14. Since the second flange portion 114 has the taper shape as described above, the third flange portion 116 is disposed radially outside the electric motor coupling rotating element side coupling portion 110 with a portion of the pump cover 16b interposed therebetween.

The electric motor coupling gear 68 described above includes the outer circumferential teeth 122 having the central axis identical to the first axial center RC1 and engaging with the electric motor output gear 56 as well as an annular fitting portion 124 fitted to the coupling member 70, a supporting portion 126 extended from the fitting portion 124 toward the torque converter 14 (the engine 10) in the first axial center RC1 direction, and an intermediate flange portion 128 disposed radially outside the fitting portion 124 and the supporting portion 126 to couple the outer circumferential teeth 122 and the supporting portion 126. The fitting portion 124 has an inner circumferential portion spline-fitted to the outer circumferential end of the third flange portion 116 of the coupling member 70 and, consequently, the electric motor coupling gear 68 is coupled relatively non-rotatably around the first axial center RC1 to the coupling member 70. A snap ring 130 is in contact with a side surface of the third flange portion 116 on the side of the hydraulic pump 16 and is fitted into a snap ring groove disposed in the inner circumferential portion of the fitting portion 124.

The supporting portion 126 of the electric motor coupling gear 68 has a cylindrical shape with the central axis identical to the first axial center RC1 and supports the electric motor coupling rotating element 66 (the electric motor coupling gear 68, the coupling member 70) rotatably around the first axial center RC1 relative to the case 12, which is a non-rotating member. The supporting portion 126 has a portion disposed to overlap with the pump cover 16b in the direction orthogonal to the first axial center RC1, i.e., in the radial direction. Specifically, in an axial range W2 of FIG. 5, the supporting portion 126 is disposed to overlap with the pump cover 16b in the radial direction. The ball bearing 72 is disposed radially inside the supporting portion 126 and radially outside the electric motor coupling rotating element side coupling portion 110 and the second flange portion 114 of the coupling member 70. The outer ring of the ball bearing 72 is fitted into the inner circumference of the supporting portion 126, and the outer ring and the supporting portion 126 integrally rotate around the first axial center RC1. The supporting portion 126 includes an annular bearing locking portion 132 projecting from the end portion on the side opposite to the fitting portion 124 radially inward along an end surface of the outer ring of the ball bearing 72 on the side of the torque converter 14 (the engine 10). As depicted in FIG. 5, in the first axial center RC1 direction, the third flange portion 116 of the coupling member 70 and the outer ring of the ball bearing 72 are disposed to be sandwiched between the bearing locking portion 132 and the snap ring 130 and, therefore, the electric motor coupling gear 68, the coupling member 70, and the ball bearing 72 are relatively unmovable in the first axial center RC1 direction to each other.

The intermediate flange portion 128 of the electric motor coupling gear 68 is projected radially outward from the outer circumference of the supporting portion 126 into a disc shape and the outer circumferential teeth 122 are disposed at the outer circumferential end of the intermediate flange portion 128. Because of such a configuration of the electric motor coupling gear 68 and the coupling member 70, the outer circumferential teeth 122 of the electric motor coupling gear 68 are disposed to overlap with the supporting portion 126 and the electric motor coupling rotating element side coupling portion 110 of the coupling member 70 in the direction orthogonal to the first axial center RC1, i.e., in the radial direction. Specifically, the outer circumferential teeth 122 are disposed to overlap with the supporting portion 126 in the radial direction in an axial range W3 of FIG. 5 and are disposed to overlap with the electric motor coupling rotating element side coupling portion 110 in the radial direction in an axial range W4 of FIG. 5. Moreover, the outer circumferential teeth 122 are disposed to overlap with the pump cover 16*b* in the radial direction.

The case 12 includes a partition wall 134 disposed between the side wall 108 of the torque converter case 14*d* on the side of the hydraulic pump 16 and the electric motor coupling rotating element 66 and having the thickness direction identical to the first axial center RC1 direction and a cylindrical bearing supporting portion 136 projecting from the partition wall 134 toward the hydraulic pump 16 in the first axial center RC1 direction. The inner ring of the ball bearing 72 is fitted into the outer circumference of the bearing supporting portion 136. The inner circumferential surface of the inner ring of the ball bearing 72 and the outer circumferential surface of the bearing supporting portion 136 are disposed with respective snap ring grooves facing each other and a snap ring 138 is fitted into the both snap rind grooves. The fitting of the snap ring 138 makes the ball bearing 72 unmovable in the first axial center RC1 direction relative to the case 12.

In the drive device 8 configured as above, for example, if engine running is performed by using the engine 10 as the drive force source for running, the engine intermittent clutch K0 is engaged, thereby transmitting the drive force from the engine 10 to the pump impeller 14*a*. Since the electric motor MG is coupled to the pump impeller 14*a* via the electric motor output gear 56, the electric motor coupling rotating element 66, etc., the electric motor MG is caused to output an assist torque as needed in the engine running. On the other hand, if EV running (motor running) is performed by using the electric motor MG as the drive force source for running with the engine 10 stopped, the engine intermittent clutch K0 is released to interrupt the power transmission path between the engine 10 and the torque converter 14 and the electric motor MG is caused to output the drive force for running.

During vehicle stop such as when the running vehicle 6 temporarily stops, for example, the engine intermittent clutch K0 is released to stop the engine 10 and the electric motor MG is caused to rotationally drive the hydraulic pump 16 and to output a creep torque. When the creep torque is output, the drive force from the electric motor MG is transmitted via the torque converter 14 to the drive wheels 28 and, therefore, the output of the creep torque is easily controlled such that the uncomfortable feeling of passengers is suppressed.

During the braking of the vehicle 6, for example, the electric motor MG is caused to perform regenerative operation to generate electricity with the electric motor MG from a vehicle braking force and the generated electricity is stored in the electric storage device.

When the engine 10 is started, for example, the engine intermittent clutch K0 is engaged and the engine 10 is rotated by the electric motor torque Tmg for engine start. The same applies to the case of starting the engine 10 during EV running and, in this case, the electric motor MG is caused to output the electric motor output acquired by adding the output for engine start to the output for vehicle running.

According to this embodiment, the engine 10 and the torque converter 14 are disposed to rotate around the first axial center RC1 (one axial center) and the electric motor MG is disposed with a rotation axial center (the second axial center RC2) different from the first axial center RC1 and is coupled to the input-side rotating element (the pump impeller 14*a*, the torque converter case 14*d*) of the torque converter 14 receiving the input of the drive force from the engine 10 and rotatable around the first axial center RC1. Therefore, as compared to the case that the engine 10, the torque converter 14, and the electric motor MG are disposed in series on the first axial center RC1, the entire axial length of the drive device 8 can be reduced. Therefore, even if the series disposition of the engine 10, the torque converter 14, and the electric motor MG is difficult due to limitation of vehicle width in, for example, the FF vehicle 6 such as this embodiment having the engine 10 transversely mounted, the drive device 8 with the shorter entire axial length can easily be mounted on the vehicle 6. If the engine 10, the torque converter 14, and the electric motor MG are disposed in series on the first axial center RC1, the case 12 needs to include an electric motor supporting wall for supporting the electric motor MG having the thickness direction identical to a direction of the first axial center RC1; however, the drive device 8 of this embodiment does not need to be disposed with such an electric motor supporting wall and this also contributes to the reduction in the entire axial length of the drive device 8.

According to this embodiment, since the number of teeth of the electric motor output gear 56 is smaller than the number of teeth of the electric motor coupling gear 68, the output torque Tmg of the electric motor MG is amplified and transmitted from the electric motor MG to the pump impeller 14*a*. Therefore, as compared to the case that the rotation of the electric motor MG is transmitted to the pump impeller 14*a* without speed reduction, the maximum value of the electric motor torque Tmg can be lowered. Therefore, it is easy to miniaturize the electric motor MG and to make the electric motor MG inexpensive. Since the electric motor MG is disposed with the rotation axial center (the second axial center RC2) different from the first axial center RC1, the reduction gear made up of the electric motor output gear 56 and the electric motor coupling gear 68 is advantageously easily disposed.

According to this embodiment, the electric motor MG is coupled to the torque converter case 14*d* via the electric motor coupling rotating element 66 coupled relatively non-rotatably to the torque converter case 14*d*; the hydraulic pump 16 is disposed such that the pump rotor 16*c* rotates around the first axial center RC1; and the supporting portion 126 of the electric motor coupling gear 68 is disposed to overlap with the pump cover 16*b* in the direction orthogonal to the first axial center RC1. Therefore, as compared to the case that the supporting portion 126 does not overlap with the pump cover 16*b* in the direction orthogonal to the first axial center RC1, the entire axial length of the drive device 8 can be reduced. The pump rotor 16*c* is disposed to rotate around the first axial center RC1 and, therefore, for example, as compared to the case that the hydraulic pump 16 is disposed on an axial center completely different from the torque converter 14 etc., a duct line can be shortened between an oil pressure supply destination of the hydraulic pump 16, for example, the torque converter 14 or the ball bearing 72 on the first axial center RC1, and the hydraulic pump 16. Therefore, the fluid resistance of the duct line can be reduced to prevent deterioration in fuel economy.

According to this embodiment, the electric motor coupling rotating element side coupling portion 110 is disposed to overlap with the pump cover 16*b* in the direction orthogonal to the first axial center RC1. Therefore, as compared to the case that the electric motor coupling rotating element side coupling portion 110 does not overlap with the pump cover 16*b* in the direction orthogonal to the first axial center RC1, the entire axial length of the drive device 8 can be reduced.

According to this embodiment, the outer circumferential teeth 122 of the electric motor coupling gear 68 included in the electric motor coupling rotating element 66 are disposed to overlap with the supporting portion 126 and the electric motor coupling rotating element side coupling portion 110 of the coupling member 70 in the direction orthogonal to the first axial center RC1, i.e., in the radial direction. Therefore, the length in the first axial center RC1 direction of the electric motor coupling rotating element 66 can be reduced and the entire axial length of the drive device 8 can consequently be reduced.

According to this embodiment, the torque converter case 14d making up a portion of the input-side rotating element of the torque converter 14 is coupled via the engine intermittent clutch K0 to the engine 10. Therefore, the engine 10 can be stopped during vehicle running and the fuel economy can be improved. In other words, the EV running can be performed.

Although the embodiment of the present invention has been described in detail with reference to the drawings, this is merely an exemplary embodiment and the present invention may be implemented in variously modified and improved forms based on the knowledge of those skilled in the art.

For example, although the electric motor MG is coupled to the torque converter case 14d by one gear pair made up of the electric motor coupling rotating element 66 and the electric motor output gear 56 in the embodiment, such a gear pair is not a limitation and the electric motor MG may be coupled to the torque converter case 14d through a transmission belt or a chain.

Although the engine 10 is coupled via the engine intermittent clutch K0 to the pump impeller 14a of the torque converter 14 in the embodiment, the engine intermittent clutch K0 may not be disposed such that the power transmission path between the engine 10 and the pump impeller 14a cannot be interrupted.

Although the first axial center RC1 and the second axial center RC2 are axial centers parallel to each other in the embodiment, the first axial center RC1 and the second axial center RC2 may not be parallel.

Although the drive device 8 is transversely mounted on the FF vehicle 6 in the embodiment, the vehicle 6 may be of the FR type and the drive device 8 may longitudinally be mounted.

Although the engine intermittent clutch K0 is a wet multi-plate type hydraulic friction engagement device in the embodiment, the engine intermittent clutch K0 may be of the dry type and may be a clutch of another operation mode such as an electromagnetic clutch.

Although the lockup clutch 42 is disposed in the embodiment, the lockup clutch 42 is not essential.

Although the automatic transmission 18 is a stepped automatic transmission in the embodiment, the automatic transmission 18 may be a CVT capable of varying a gear ratio γ in a stepless manner or may be replaced with a manual transmission. The drive device 8 without the automatic transmission 18 is also conceivable.

Although the hydraulic pump 16 is disposed on the first axial center RC1 in the embodiment, it is conceivable that the hydraulic pump 16 is disposed on the second axial center RC2.

Although the hydraulic pump 16 is a mechanical oil pump in the embodiment, the hydraulic pump 16 may be an electric oil pump. If the hydraulic pump 16 is an electric oil pump, the hydraulic pump 16 may be disposed separately from the first axial center RC1.

Although the torque converter 14 is used as a hydraulic transmission device in the embodiment, the torque amplification effect of the torque converter 14 is not necessarily needed and, for example, the torque converter 14 may be replaced with a fluid coupling without the torque amplification effect.

Figure 6:
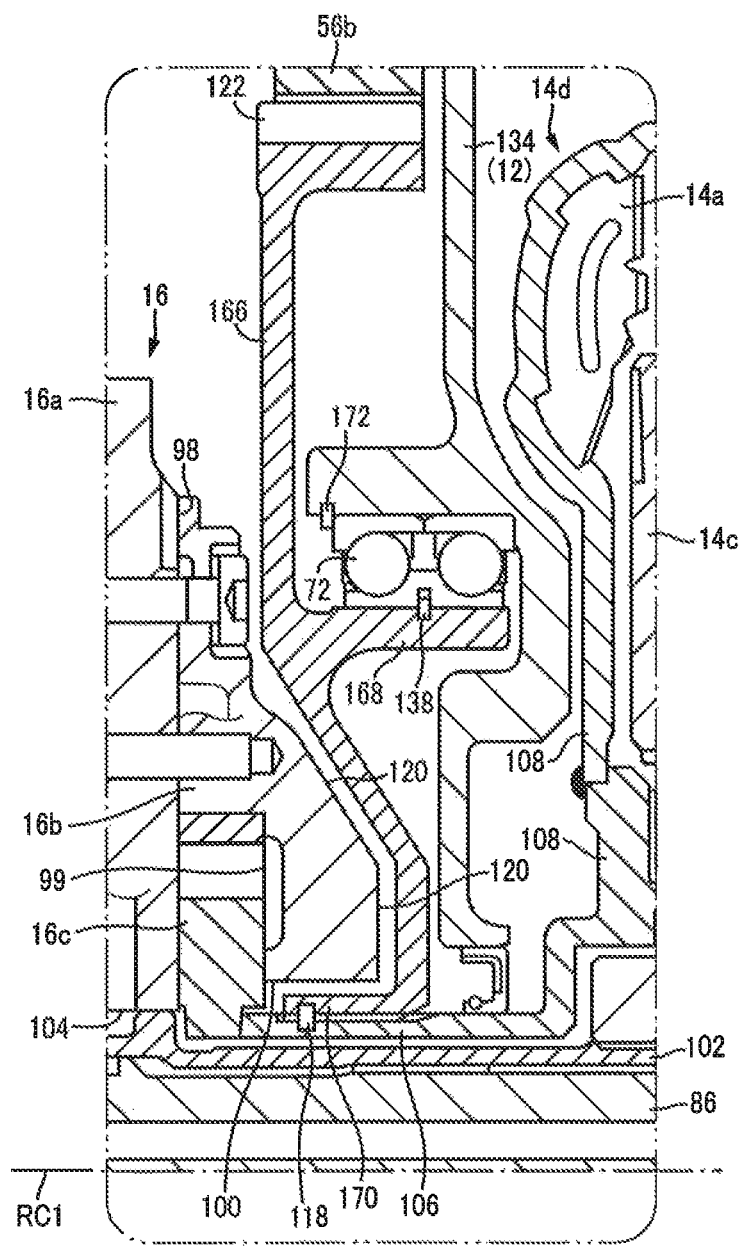
FIG. 6 is a cross-sectional view of an example of an electric motor coupling rotating element made up of one member in the vehicle drive device of FIG. 1, and corresponding to FIG. 5 to show a different example from the electric motor coupling rotating element depicted in FIG. 5.

Although the electric motor coupling rotating element 66 is made up of a plurality of members, which are the electric motor coupling gear 68 and the coupling member 70 in the embodiment, the electric motor coupling rotating element 66 may be made up of one member. FIG. 6 is a cross-sectional view of an example of an electric motor coupling rotating element made up of one member unlike the embodiment, corresponding to FIG. 5. FIG. 6 depicts an example of replacing the electric motor coupling rotating element 66 of FIG. 5, i.e., the electric motor coupling gear 68 and the coupling member 70, with an electric motor coupling rotating element 166. Reference numeral 168 of FIG. 6 denotes a supporting portion of the electric motor coupling rotating element 166, and the supporting portion supports the electric motor coupling rotating element 166 rotatably around the first axial center RC1 relative to the case 12 and corresponds to the supporting portion 126 of FIG. 5. Reference numeral 170 of FIG. 6 denotes a coupling portion of the electric motor coupling rotating element 166 and the coupling portion couples the electric motor coupling rotating element 166 relatively non-rotatably around the first axial center RC1 to the torque converter case 14d by the spline fitting and corresponds to the electric motor coupling rotating element side coupling portion 110 of FIG. 5. Although either the inner ring or the outer ring of the ball bearing 72 may be fitted into the case 12, in FIG. 5 described above, the inner ring of the ball bearing 72 is fitted into the case 12 while the outer ring is fitted into the electric motor coupling rotating element 66 (the electric motor coupling gear 68); however, in FIG. 6, conversely, the inner ring of the ball bearing 72 is fitted into the electric motor coupling rotating element 166 while the outer ring is fitted into the case 12. The electric motor coupling rotating element 166 of FIG. 8 is made unmovable in the first axial center RC1 direction relative to the case 12 by the fitting of the snap ring 138 and the fitting of the snap ring 172 as is the case with the electric motor coupling rotating element 66 of FIG. 5.

NOMENCLATURE OF ELEMENTS

8: drive device (vehicle drive device)
10: engine
12: case (non-rotating member)
14: torque converter (hydraulic transmission device)
14a: pump impeller input-side rotating element)
14d: torque converter case (input-side rotating element)
16: hydraulic pump
16b: pump cover
16c: pump rotor (rotor)
28: drive wheels
66, 166: electric motor coupling rotating element
110: electric motor coupling rotating element side coupling portion (coupling portion
122: outer circumferential teeth
126: supporting portion
MG: electric motor
K0: engine intermittent clutch
RC1: first axial center (one axial center)

The invention claimed is:

1. A vehicle drive device comprising: an engine; a hydraulic transmission device constituting a portion of a power transmission path between the engine and drive wheels; and an electric motor,
the engine and the hydraulic transmission device disposed such that a rotation axial center of each of the engine and the hydraulic transmission device is disposed on the same axis,
the electric motor disposed with a rotation axial center different from the rotation axial center of each of the engine and the hydraulic transmission device, the electric motor coupled to an input-side rotating element of the hydraulic transmission device receiving input of a drive force from the engine, the input-side rotating element being rotatable around the rotation axial center of each of the engine and the hydraulic transmission device, the electric motor coupled to the input-side rotating element via an electric motor coupling rotating element coupled relatively non-rotatably to the input-side rotating element, a hydraulic pump rotationally driven by the input-side rotating element of the hydraulic transmission device disposed such that a rotor of the hydraulic pump rotates around the rotation axial center of each of the engine and the hydraulic transmission device, and a coupling portion of the electric motor coupling rotating element for the input-side rotating element inserted into a pump-cover through-hole formed on an internal side of a pump cover of the hydraulic pump in a radial direction, along with a portion of the input-side rotating element, and coupled relatively non-rotatably to the input-side rotating element in the pump-cover through-hole, in order to couple the input-side rotating element to the rotor.

2. The vehicle drive device of claim 1, wherein the electric motor is disposed on the opposite side of the engine in a direction of the rotation axial center of each of the engine and the hydraulic transmission device with the hydraulic transmission device between.

3. The vehicle drive device of claim 1, wherein
the hydraulic transmission device and the electric motor are included in a transaxle case which is a non-rotating member,
the electric motor coupling rotating element includes two rotating elements which are relatively non-rotatable each other,
one rotating element of the two rotating elements has the coupling portion and the other rotating element has a supporting portion which is input-side rotating element relatively rotatably supported by the transaxle case via a bearing, and
a drive force from the electric motor is transmitted to the one rotating element via the other rotating element.

4. The vehicle drive device of claim 2, wherein
the hydraulic transmission device and the electric motor are included in a transaxle case which is a non-rotating member,
the electric motor coupling rotating element includes two rotating elements which are relatively non-rotatable each other,
one rotating element of the two rotating elements has the coupling portion and the other rotating element has a supporting portion which is input-side rotating element relatively rotatably supported by the transaxle case via a bearing, and
a drive force from the electric motor is transmitted to the one rotating element via the other rotating element.

5. The vehicle drive device of claim 1, wherein
the input-side rotating element of the hydraulic transmission device is coupled to the engine via an engine intermittent clutch, and
the engine intermittent clutch is included in a case of the hydraulic transmission device along with the input-side rotating element.

6. The vehicle drive device of claim 2, wherein
the input-side rotating element of the hydraulic transmission device is coupled to the engine via an engine intermittent clutch, and
the engine intermittent clutch is included in a case of the hydraulic transmission device along with the input-side rotating element.

7. The vehicle drive device of claim 3, wherein
the input-side rotating element of the hydraulic transmission device is coupled to the engine via an engine intermittent clutch, and
the engine intermittent clutch is included in a case of the hydraulic transmission device along with the input-side rotating element.

8. The vehicle drive device of claim 4, wherein
the input-side rotating element of the hydraulic transmission device is coupled to the engine via an engine intermittent clutch, and
the engine intermittent clutch is included in a case of the hydraulic transmission device along with the input-side rotating element.

* * * * *